Aug. 17, 1937. A. M. NEY 2,090,223
VEHICLE
Filed Oct. 23, 1934 3 Sheets-Sheet 1
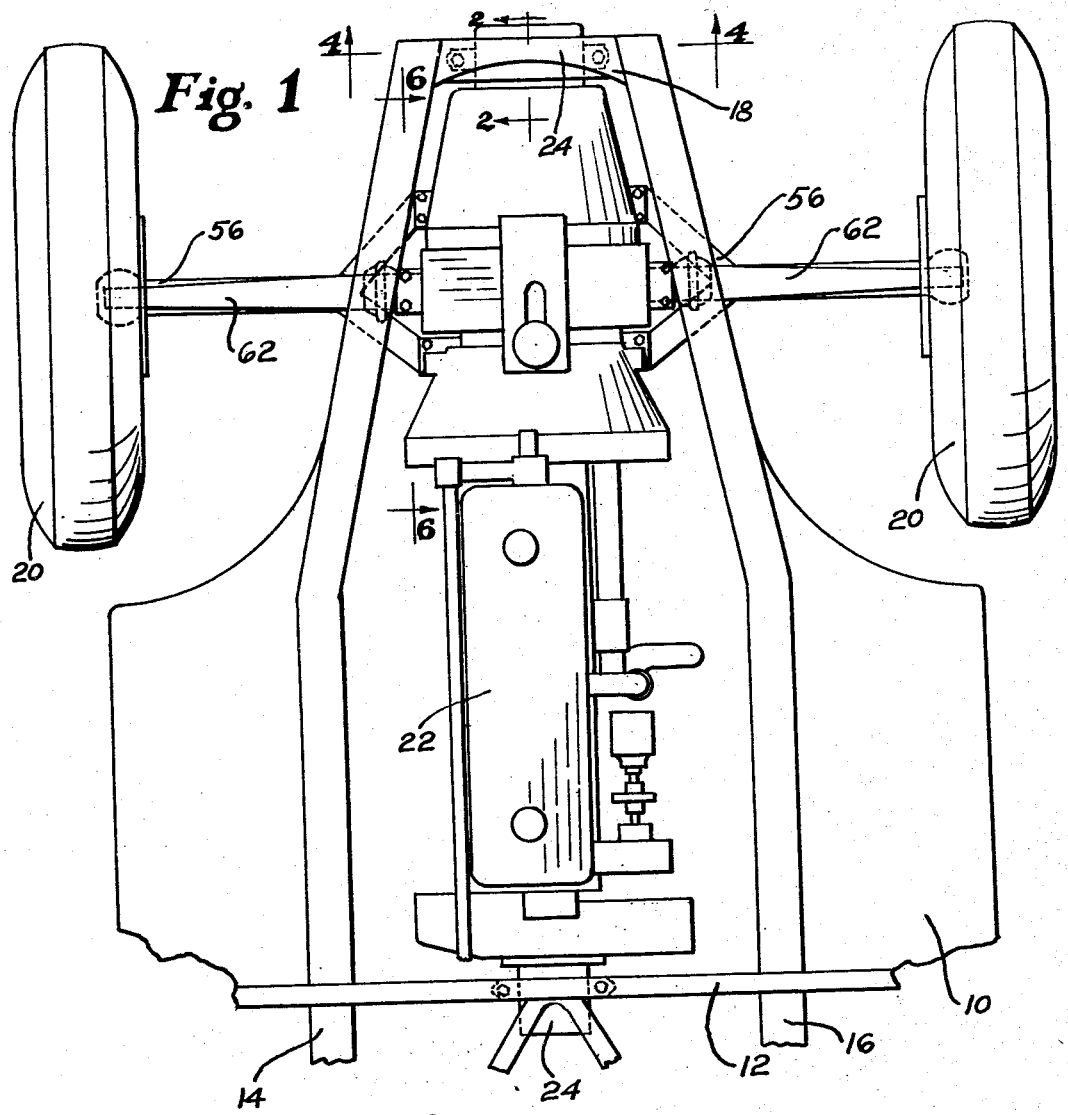
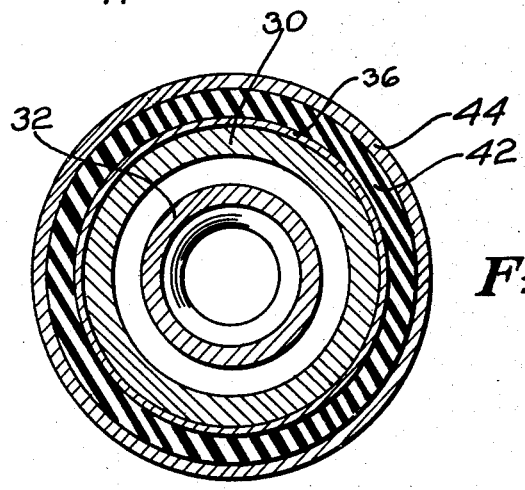
INVENTOR.
ALFRED M. NEY
BY
ATTORNEY.

Aug. 17, 1937.          A. M. NEY          2,090,223
                        VEHICLE
              Filed Oct. 23, 1934    3 Sheets-Sheet 2
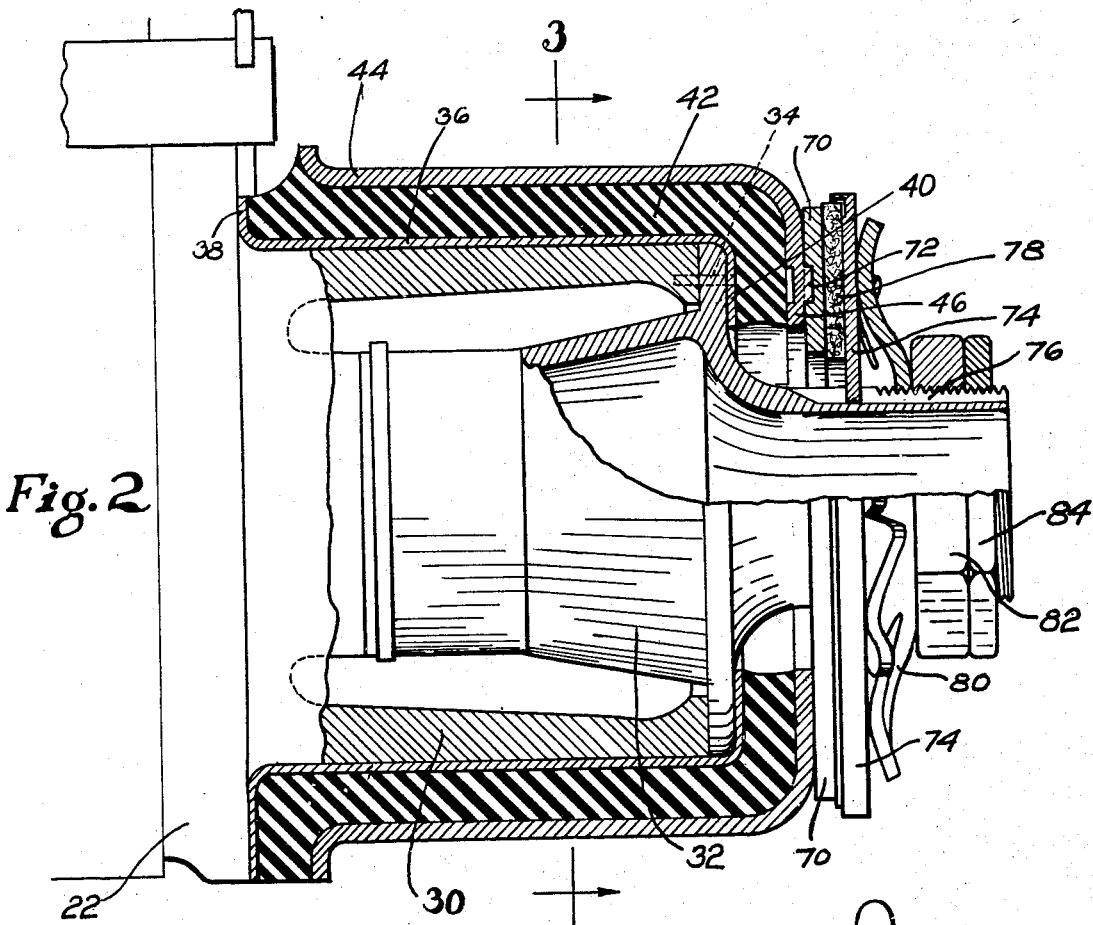
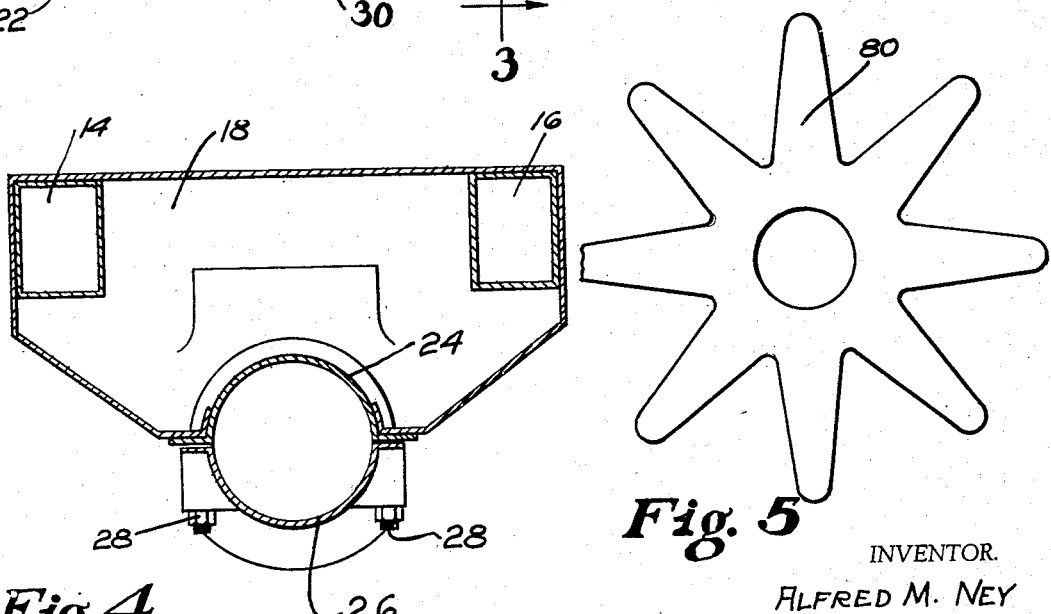
INVENTOR.
ALFRED M. NEY
BY
ATTORNEY.

Aug. 17, 1937.  A. M. NEY  2,090,223
VEHICLE
Filed Oct. 23, 1934  3 Sheets-Sheet 3
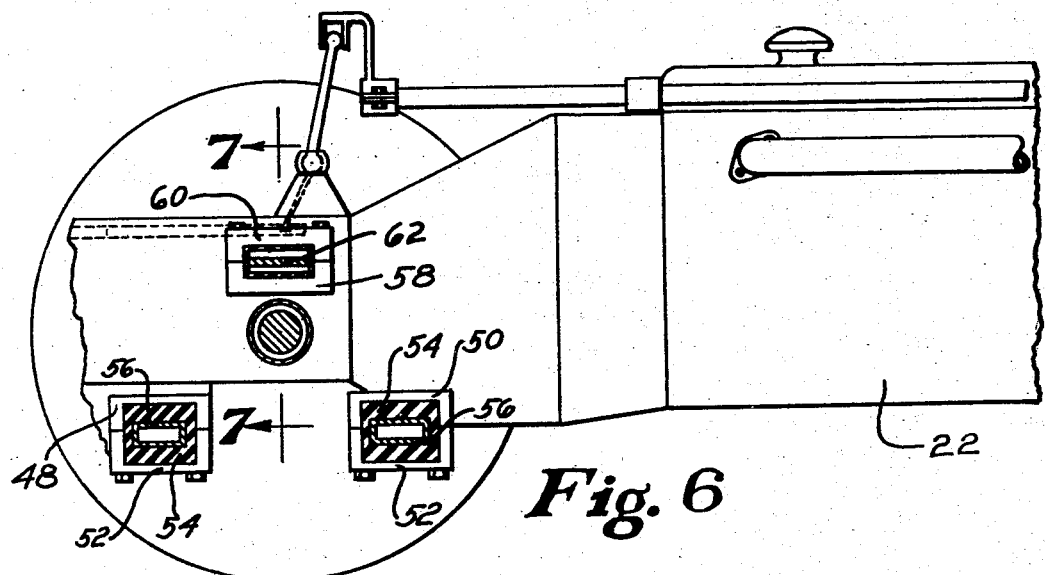
Fig. 6
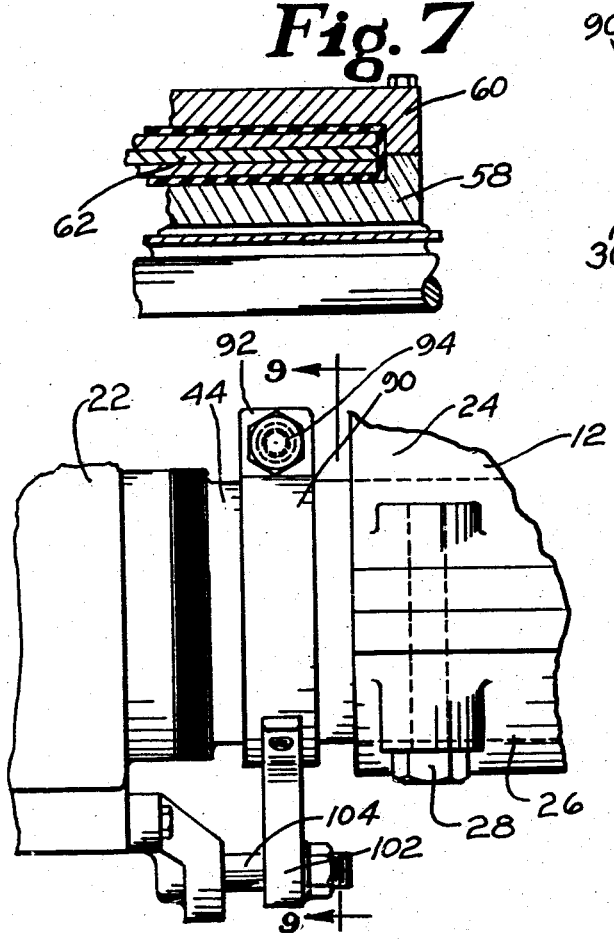
Fig. 7
Fig. 8
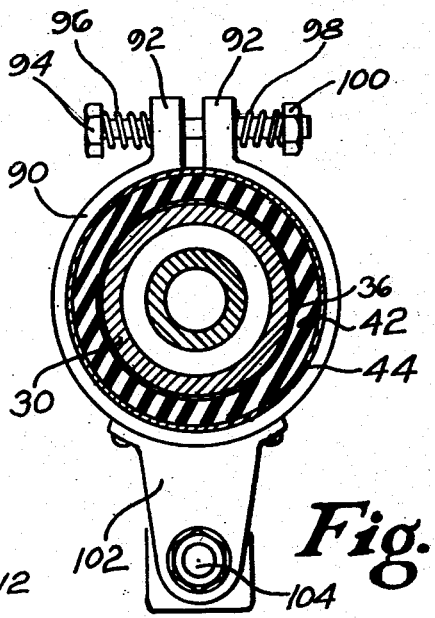
Fig. 9
INVENTOR.
ALFRED M. NEY
BY
m.w.McConkey
ATTORNEY.

Patented Aug. 17, 1937

2,090,223

UNITED STATES PATENT OFFICE 2,090,223

VEHICLE

Alfred M. Ney, St. Joseph, Mich., assignor to The Steel Wheel Corporation, Chicago, Ill., a corporation of New York Application October 23, 1934, Serial No. 749,556
In Great Britain October 6, 1934

6 Claims. (Cl. 180—64)

This invention relates to vehicles, and is illustrated as embodied in a front-drive automobile having individually sprung wheels.

Where the spring suspension of an automobile is intimately associated with a movable mounting for it, as for example where the spring suspension supports a movably mounted power plant which in turn supports one end of the chassis as in the automobile shown in the accompanying drawings, there is the danger that vibrations of the spring suspension may at times synchronize with vibrations of the mounting, permitting the building up of oscillations of considerable amplitude which may take the form of a violent shimmying of one or more of the wheels.

An object of the present invention is to avoid such simmying effects by damping out the vibrations before they can build up sufficiently to do any damage. Preferably a vibration damping device, illustrated as a friction couple or brake, damps out the vibrations before they attain any substantial sustained amplitude. I prefer to arrange the damping device to act on the movably mounted power plant; for example one of the friction elements may be connected to or formed on the power plant, while the other is connected to or formed on the chassis in which the power plant is mounted.

In the drawings my invention is shown in an automobile having a power plant provided at its ends with bosses pivoted in coaxial bearings carried by the chassis, and having on its opposite sides individual spring suspension devices independently connecting it to the two wheels. In such an automobile road inequalities give rise to vibrations in the spring suspension, and the engine torque reaction and the reaction from the spring suspension both cause vibrations in the engine mounting.

In order to avoid the possibility of the vibrations synchronizing and building up to a noticeable or even dangerous amplitude, with the accompanying danger of wheel shimmy, I include in the described combination a vibration damper acting on one of the parts subject to vibration, and shown as acting on the engine mounting.

I prefer to utilize a vibration damper of the friction type, and two desirable and effective forms of such devices are therefore illustrated in the drawings. In one form, there are a pair of friction disks, connected respectively to a supporting part at one end of the power plant and to a bearing carried by the chassis and in which said part is journaled. These disks are urged together by yielding means such as a spring washer, means preferably being provided for adjusting the tension. In the other illustrated form a friction device pivotally connected to the chassis is contracted frictionally, preferably under adjustable spring tension, about a part secured to or integral with the pivotal support at one end of the power plant.

Both of these vibration dampers embody novel features of construction and arrangement. These features and other novel combinations and desirable constructions will be apparent from the following description of the illustrative embodiments shown in the accompanying drawings, in which:

Figure 1 is a top plan view of the front end of an automobile embodying my invention;

Figure 2 is a partial section on the line 2—2 of Figure 1, showing the front power plant support;

Figure 3 is a section through the support on the line 3—3 of Figure 2;

Figure 4 is a section on the line 4—4 of Figure 1, showing the bearing in which the support of Figure 2 is mounted;

Figure 5 is an elevation of the spring washer used in the vibration damper shown in Figure 2;

Figure 6 is a partial section on the line 6—6 of Figure 1, showing the arrangement of the parts of the spring suspension;

Figure 7 is a partial section on the line 7—7 of Figure 6, showing the rubber seat for one of the arms of the spring suspension;

Figure 8 is a partial elevation of the rear power plant support, showing a different form of vibration damper; and Figure 9 is a section on the line 9—9 of Figure 8, showing the vibration damper in front elevation.

The illustrated automobile includes a chassis 10 having a transversely-extending dash 12 and a pair of spaced frame members 14 and 16 extending longitudinally forward of the dash and connected at their front ends by a support 18 welded or otherwise secured thereto. This chassis may be constructed as fully described in application No. 718,929 filed April 4, 1934, by Victor W. Kliesrath.

The automobile is supported at its front end on dirigible front wheels 20 driven by a power plant 22, shown as including in one unit an engine and a clutch and a transmission and a differential.

The two ends of the power plant are pivotally mounted in coaxial bearings carried by the dash 12 and the front support 18 respectively, and each of which includes an upper half-bearing 24 integral with or rigidly secured to the dash or to said support, and a lower half-bearing in the form of a detachable cap 26 secured in place by means such as bolts 28.

Each end of the power plant is provided with a part supported in the corresponding one of the above-described bearings, and the front one of which is shown in detail in Figure 2. The end of the power plant casing is provided with a cylindrical boss 30, to which is pinned or otherwise rigidly secured in the case of the front support a housing 32 for permitting access when necessary to the shaft of the power plant by means of a hand crank.

On the boss 30 there is pressed (and if necessary also secured by one or more pins or keys 34) a cylindrical stamping 36 having at its rear end an outwardly projecting flange 38 which seats against the front of the power plant casing, and having at its front end an inwardly-turned flange 40 seated against a flat face formed on the housing 32.

Encircling and sleeved on the stamping 36 is a bushing 42 of non-metallic resilient material such as rubber, vulcanized or otherwise bonded securely to the surface of the stamping 36. Interiorly similarly bonded to the outer surface of the bushing 42 is an outer cylindrical stamping 44 having at its front end an inwardly-extending flange 46. The stamping 44 is clamped tightly between the two half-bearings 24 and 26, and is held from turning thereby. Thus the movements of the power plant relatively to the chassis are taken in the rubber 42.

Each side of the power plant casing is shown provided with three sockets, the two lower sockets 48 and 50 being at the same level and having detachable caps 52 holding sleeves or blocks 54 of rubber gripping the ends of diverging arms formed in a Y-shaped axle section 56 of stamped steel. An upper socket 58, provided with a detachable cap 60, grips the end of an upper arm which is shown as a leaf spring 62. The arms 56 and 62, carry at their outer ends a knuckle on which the corresponding wheel 20 is journaled. The sockets 48, 50 and 58 may either be integral with or rigidly secured to the casing of the power plant.

The above-described spring suspension is claimed per se in application No. 697,280 filed November 9, 1933, by Victor W. Kliesrath.

It will be seen that in this automobile there are two sources of vibrations,—the spring suspension and the movable engine mounting. In order to prevent possible synchronizing of vibrations, and consequent building up of vibrations of increasing amplitude possibly even eventually becoming powerful enough to cause the wheel to shimmy, according to an important feature of the present invention I associate with the parts described above a vibration damper, preferably associated with one of the power plant supports.

In the embodiment of Figure 2, a disk 70 is secured to the flange 46, or otherwise operatively associated with the fixed bearing or support. As shown, teeth 72 punched from flange 46 project into recesses in the disk 70 and key the flange and the disk together.

A second disk 74 is mounted on the front end of the cylindrical housing 32 (which is rigid with the power plant), and is formed with teeth or keys projecting into grooves or keyways 76 formed in the part 32, so that the disk 74 oscillates with the power plant. One or both of the disks 70 and 74 is faced with clutch facing or other friction material 78 riveted or otherwise secured thereto.

The two disks are yieldingly urged together by means such as a spring washer 80 adjustably compressed by means such as a nut 82 threaded on the end of the port 32, and shown backed up by a locknut 84.

In the embodiment shown in Figures 8 and 9, the stamping or sleeve 44 of the rear power plant support is encircled by a friction band 90 having its ends formed as apertured lugs 92 through which projects a bolt 94. A spring 96 is compressed between the head of the bolt 94 and one of the lugs 92, and a second spring 98 is compressed between the other lug 92 and a nut 100 threaded on the end of the bolt 94. I prefer to tighten the nut 100 until the two springs 96 and 98 sleeved on the bolt 94 are compressed to approximately 35 pounds tension.

An arm 102, riveted or otherwise secured to the friction band 90 opposite the lugs 92, is provided with means such as a stud or bolt 104 pivotally connecting it to the power plant casing. The stud 104 may be rigid with the power plant casing, and a loose fit in arm 102. Thus the oscillations of the power plant cause the friction band 90 to oscillate on the stationary sleeve 44.

In both embodiments it will be seen that the friction vibration damper damps out oscillations before they can build up to a dangerous amplitude.

While two embodiments have been described in detail, it is not my intention to limit the scope of the invention to those particular embodiments, or otherwise than by the terms of the appended claims.

I claim:

1. A vehicle having road wheels, a movably mounted power plant, yielding individual spring suspension devices arranged on opposite sides of the power plant and connecting said power plant independently to said wheels and supporting it upon said wheels, a chassis movably connected to and supported by the power plant and vibration-damping means connected to said power plant and to the vehicle chassis for preventing the building up of synchronized vibrations in said power plant and said spring suspension devices.

2. A vehicle having road wheels, a movably mounted power plant, yielding individual spring suspension devices arranged on opposite sides of the power plant and connecting said power plant independently to said wheels and supporting it upon said wheels, a chassis movably connected to and supported by the power plant and vibration-damping means connected to said power plant and to the vehicle chassis for frictionally restraining movement of said power plant and preventing the building up of synchronized vibrations in said power plant and said spring suspension devices.

3. A vehicle having a chassis, a power plant having at its ends coaxial pivots connecting it to said chassis, vibration-damping means connected to said power plant and to said chassis, road wheels and individual spring suspension devices on opposite sides of the power plant yieldingly connecting the power plant independently to said wheels.

4. A vehicle having a chassis, a power plant having at its ends coaxial pivots connecting it to said chassis, vibration-damping means comprising frictionally-engaging parts connected respectively to said power plant and to said chassis, road wheels, and individual spring suspension devices on opposite sides of the power plant yieldingly connecting the power plant independently to said wheels.

5. A vehicle having a chassis, a power plant having at its ends coaxial pivots connecting it to said chassis, and vibration-damping means connected to said power plant and said chassis and including a friction device encircling and frictionally engaging one of said pivots.

6. A vehicle having a chassis, a power plant having at its ends coaxial pivots connecting it to said chassis, and vibration-damping means connected to said power plant and said chassis and including a friction device encircling and frictionally engaging one of said pivots and means for yieldingly contracting said friction device.

ALFRED M. NEY.